United States Patent
Numata

(10) Patent No.: US 10,875,170 B2
(45) Date of Patent: Dec. 29, 2020

(54) ELECTRIC POWER TOOL

(71) Applicant: MAKITA CORPORATION, Anjo (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 89 days.

(21) Appl. No.: 16/123,604

(22) Filed: Sep. 6, 2018

(65) Prior Publication Data

US 2019/0077004 A1 Mar. 14, 2019

(30) Foreign Application Priority Data

Sep. 13, 2017 (JP) .................................. 2017-175686
Jun. 20, 2018 (JP) .................................. 2018-117111

(51) Int. Cl.
| | |
|---|---|
| *B25F 5/00* | (2006.01) |
| *H02K 9/04* | (2006.01) |
| *B23D 45/16* | (2006.01) |
| *H02K 9/08* | (2006.01) |
| *H02K 11/33* | (2016.01) |
| *H02K 9/06* | (2006.01) |
| *H02K 7/14* | (2006.01) |
| *B27B 9/02* | (2006.01) |

(Continued)

(52) U.S. Cl.
CPC .............. *B25F 5/008* (2013.01); *B23D 45/16* (2013.01); *B27B 9/02* (2013.01); *H02K 7/145* (2013.01); *H02K 9/04* (2013.01); *H02K 9/06* (2013.01); *H02K 9/08* (2013.01); *H02K 11/33* (2016.01); *H02K 9/20* (2013.01); *H02K 9/22* (2013.01)

(58) Field of Classification Search
CPC . B25F 5/008; B25F 5/00; B23D 47/00; B23D 47/12; B23D 45/16; B27B 9/02; H02K 11/33; H02K 7/145; H02K 9/104; H02K 9/06; H02K 9/08
USPC ................. 361/697; 310/50, 64, 58, 59, 60 R
See application file for complete search history.

(56) References Cited

U.S. PATENT DOCUMENTS

| | | | |
|---|---|---|---|
| 7,764,502 B2 * | 7/2010 | Erb ......................... | B25F 5/008 165/104.26 |
| 8,803,377 B2 * | 8/2014 | Lau ......................... | B25F 5/008 310/50 |

(Continued)

FOREIGN PATENT DOCUMENTS

| | | |
|---|---|---|
| CN | 101594969 A | 12/2009 |
| CN | 101765351 A | 6/2010 |

(Continued)

OTHER PUBLICATIONS

U.S. Appl. No. 16/409,918, filed May 13, 2019 in the name of Fumitoshi Numata.

(Continued)

*Primary Examiner* — Ghassem Alie
*Assistant Examiner* — Nhat Chieu Q Do
(74) *Attorney, Agent, or Firm* — Oliff PLC

(57) ABSTRACT

In an electric power tool 1 including a motor 20, a cooling fan 24 for cooling the motor 20, a plurality of intake ports 11a through which outside air is introduced by use of said cooling fan 24, and a heating element 50 That generates heat, a heat sink 40 is disposed between the motor 20 and the intake port 11a. The heating element 50 is connected to the heat sink 40 through a heat pipe 30.

12 Claims, 14 Drawing Sheets

(51) Int. Cl.
    *H02K 9/22*           (2006.01)
    *H02K 9/20*           (2006.01)

(56) References Cited

U.S. PATENT DOCUMENTS

| | | | |
|---|---|---|---|
| 9,757,806 B2 | 9/2017 | Naito et al. | |
| 2006/0012254 A1* | 1/2006 | Einheuser | H02K 5/20 |
| | | | 310/58 |
| 2010/0155023 A1 | 6/2010 | Zhou et al. | |
| 2010/0253162 A1* | 10/2010 | Sakamaki | B25D 16/00 |
| | | | 310/50 |
| 2016/0056681 A1* | 2/2016 | Major | H02K 11/33 |
| | | | 310/64 |
| 2017/0157760 A1* | 6/2017 | McAuliffe | B23D 49/16 |

FOREIGN PATENT DOCUMENTS

| | | | | |
|---|---|---|---|---|
| CN | 101875168 A | 11/2010 | | |
| CN | 103717031 A | 4/2014 | | |
| EP | 2380707 A1 | 10/2011 | | |
| JP | 2014-079812 A | 5/2014 | | |
| WO | WO-2010074006 A1 * | 7/2010 | | B25D 17/20 |

OTHER PUBLICATIONS

Aug. 24, 2020 Office Action issued in Chinese Patent Application No. 201811045279.X.

* cited by examiner

ELECTRIC POWER TOOL

CROSS-REFERENCE

This application claims priority to Japanese patent application serial number 2017-175686, filed on Sep. 13, 2017, and to Japanese patent application serial number 2018-117111, filed on Jun. 20, 2018, where the contents of both applications are incorporated herein by reference in their entirety.

TECHNICAL FIELD

The present invention generally relates to an electric power tool such as, for example, a portable circular saw provided with a heating element, such as a controller that generates heat.

BACKGROUND ART

Electric power tools such as portable circular saws that include controllers for controlling the driving of a motor serving as the tool's drive source, have been known and used widely for years. The quantity of heat generated from such controllers has become large recently, due to a higher output of the motor. Consequently, a recent high-priority issue has been to cool the heating elements such as the controllers of said electric power tools, wherein when such a controller gets heated in the tool housing, cooling is conducted in an efficient manner so as to discharge the heat outside the housing. Japanese Patent Laid-Open Patent Publication No. 2014-79812 discloses one such strategy for dealing with such a problem, where cooling air flows within the housing of the tool by rotating a cooling fan provided in a rotor shaft of the motor synchronously with the rotor shaft thereof.

However, according to the limited arrangement configurations of the electric elements in the housing of the electric power tool, it sometimes happens that cooling air introduced from the intake port of such a tool does not reach the heating element in a sufficient manner, which causes a problem, where the heating element may not be cooled in an efficient manner.

Thus, as a result of the mentioned deficiencies in the art, there is a need in such electric power tools to cool contained heating elements in an efficient manner, even if cooling air introduced from the intake port of said tools does not sufficiently reach the heating element.

SUMMARY

In one exemplary embodiment of the present disclosure, an electric power tool comprises a motor, a cooling fan for cooling said motor, an intake port through which outside air is introduced into the interior of said power tool by use of the cooling fan, a heating element that generates heat, a heat sink that is disposed between the motor and the intake port, and a heat pipe through which the heating element is connected to the heat sink.

According to this embodiment, heat generated from the heating element is transported to the heat sink, thereby cooling the heating element. The heat sink is disposed between the motor and the intake port. Because of this configuration, as the motor is driven, the heat sink is directly cooled by outside air (cooling air) taken in and introduced directly from the intake port, which is is not used to cool the motor. In this way, the heat sink is cooled in an efficient manner, and accordingly the heating element that is connected to the heat sink through the heat pipe can be cooled in an efficient manner. As a result, the heating element, to which outside air that is introduced from the intake port by use of the cooling fan does not sufficiently reach, can be cooled in an efficient manner.

In another exemplary embodiment of the disclosure, the heat sink is housed and assembled in a motor housing that houses the motor.

According to this embodiment, the heat sink can be easily fixed to the motor housing. Furthermore, small vibration of tile heat sink can be prevented.

In another exemplary embodiment of the disclosure, the heat sink is disposed around the longitudinal axis of a rotor shaft of the motor.

According to this embodiment, the heat sink is disposed in a flow path of the outside air (cooling air) introduced from the intake port. Thus, the heat sink can be cooled in an efficient manner.

In another exemplary embodiment of the disclosure, the heat sink includes a plurality of fins, where the heat sink is formed such that the plurality of fins and a connection area to which the heat pipe is connected are disposed around the axis of the rotor shaft.

According to this embodiment, the plurality of fins are formed on the Latex peripheral circumference of the penetrating portion of a heat sink main body, orthogonal to the shortest thickness direction of said body. Furthermore, in the heat sink, the plurality of fins approximately form half of the entire circumference of the heat sink main body, and the recess groove (a connection area of the heat pipe) approximately forms the other half of the entire inner peripheral circumference of the heat sink main body. In this way, the plurality of fins and the recess groove comprise the inner peripheral direction of the heat sink. Thus, flow velocity of the outside air (cooling air) introduced from the intake port is maintained, thereby improving efficiency of the heat exchange between the heat pipe and the heat sink.

In another exemplary embodiment of the disclosure, the plurality of fins are for red such that each fin surface of the plurality of fins extends in an axial direction parallel with the longitudinal axis of the rotor shaft.

According to this embodiment, the flow of the outside air (cooling air) introduced from the intake port of the motor housing can be prevented from blocking.

In another exemplary embodiment of the disclosure, the heat sink includes at least two members, and the heat pipe is connected to the heat sink such that the heat pipe is held between these two members.

According to this embodiment, the heat sink is connected to the heat pipe such that a wide contact area of the heat pipe with the heat sink can be obtained. Thus, increased amount of contact area, the speed and efficiency of the heat exchange between the heat pipe and the heat sink can be improved.

In another exemplary embodiment of the disclosure, the electric power tool is a portable circular saw, and the heating element is disposed in a position lower than or as high as the heat sink when the circular saw is used in such a mariner that a cutting depth of a saw blade of the circular saw is disposed in a normal use position.

According to this embodiment, when the cutting depth of the saw blade is set in a normal use position, and especially when the circular saw is used in a state where the cutting depth is large and accordingly the heating element is necessary to cool, a state may be maintained where heat transfer from the heat pipe to the heat dissipation portion can be performed in a rapid and efficient manner.

Figure 2:
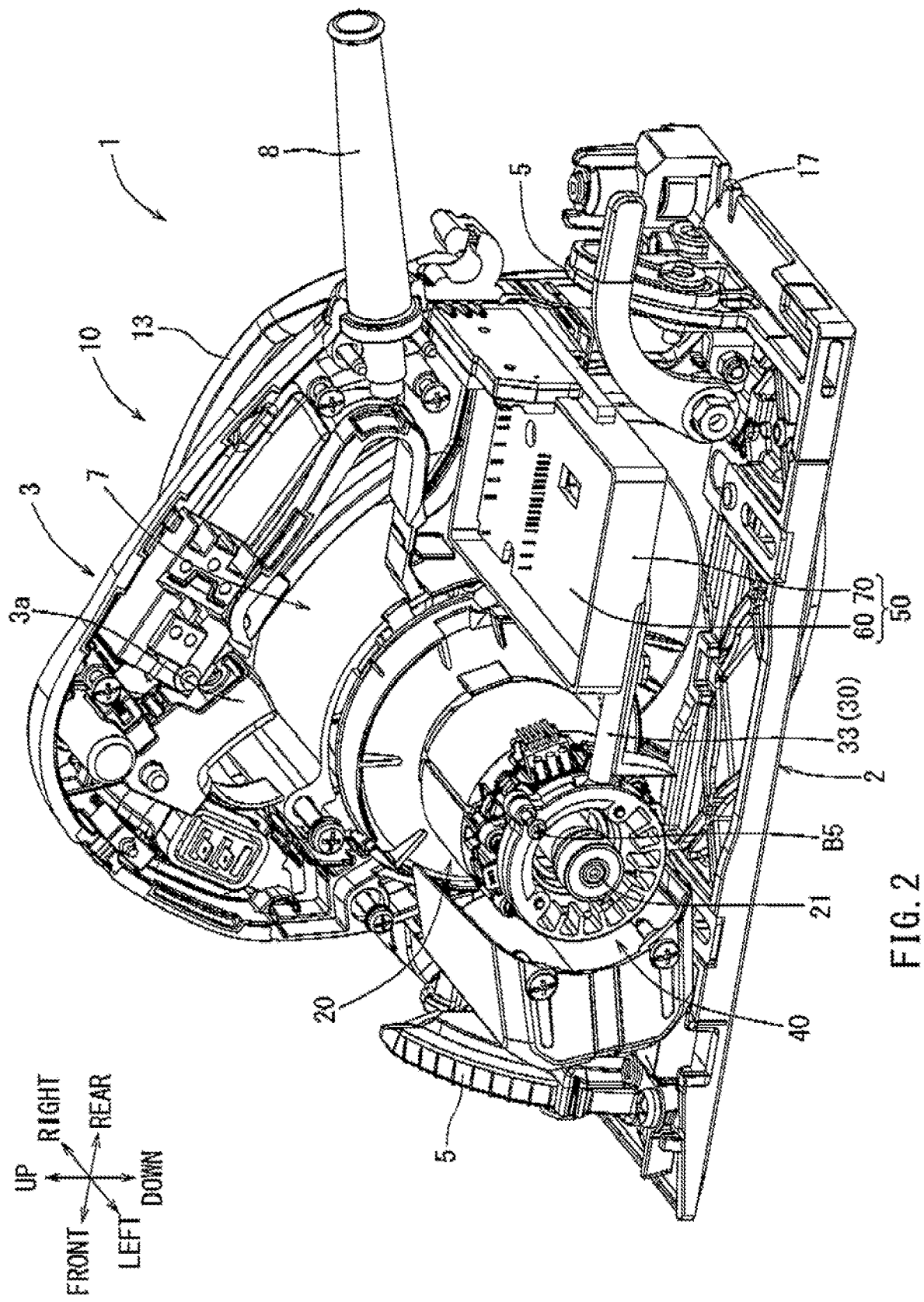
FIG. 2 is the portable circular saw showing a state where a motor housing is removed in FIG. 1.

FIC. 10 is an enlarged view of the heat sink, the heat pipe, and the controller shown in FIG. 2 viewed from an upper right.

Figure 10:
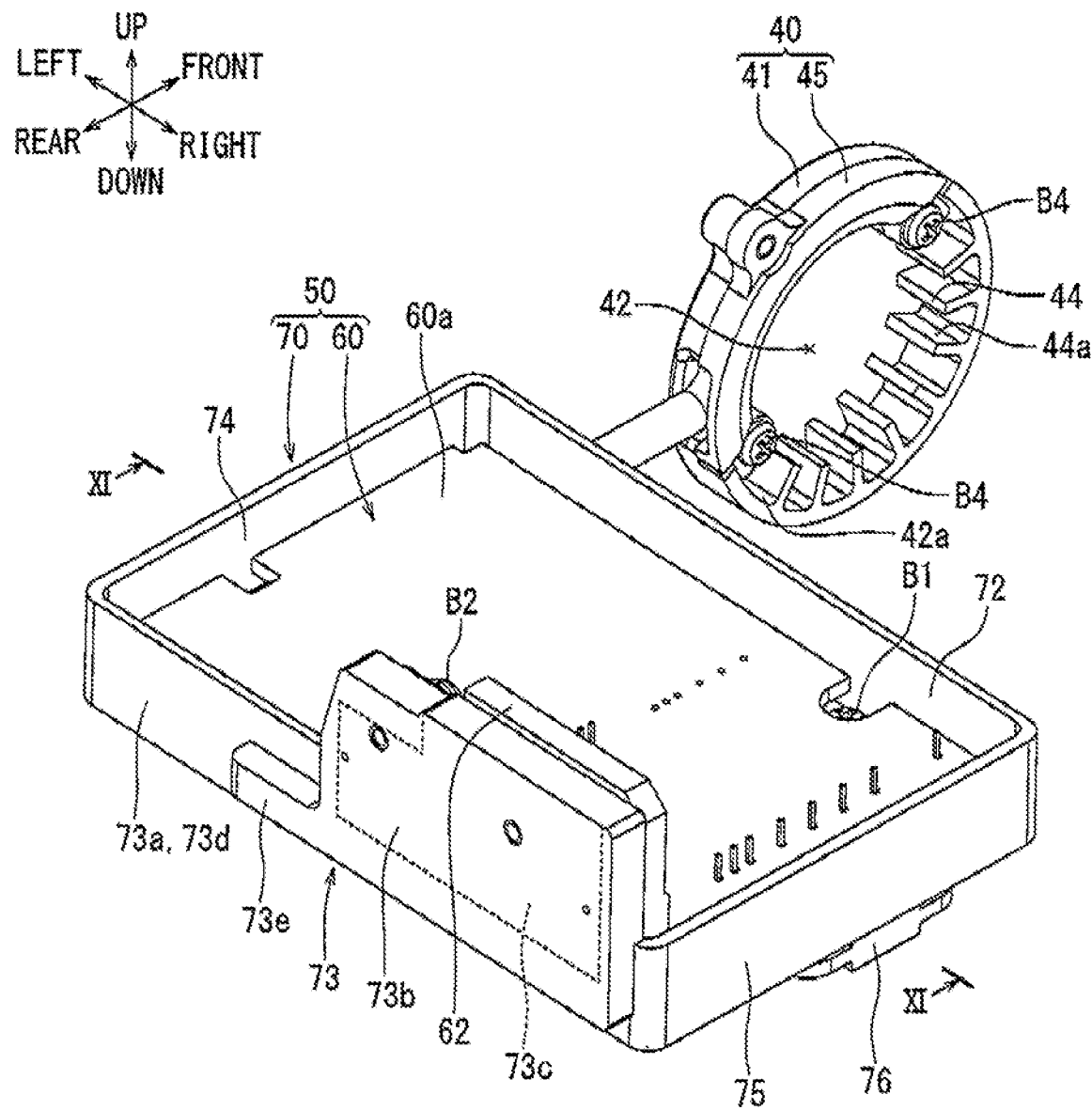
Figure 11:
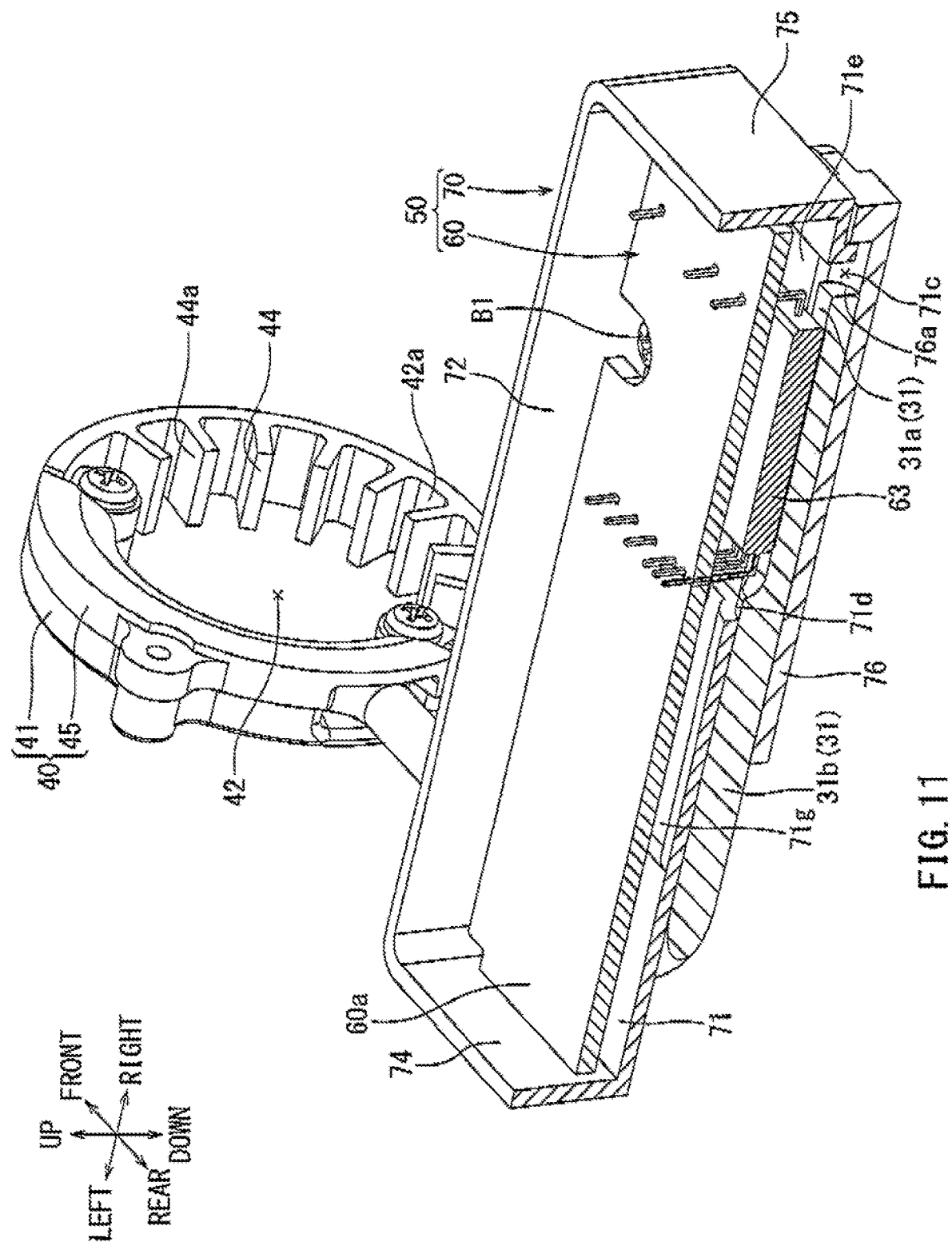

FIG. 11 is a cross-sectional view taken along line XI-XI of FIG. 10.

Figure 6:
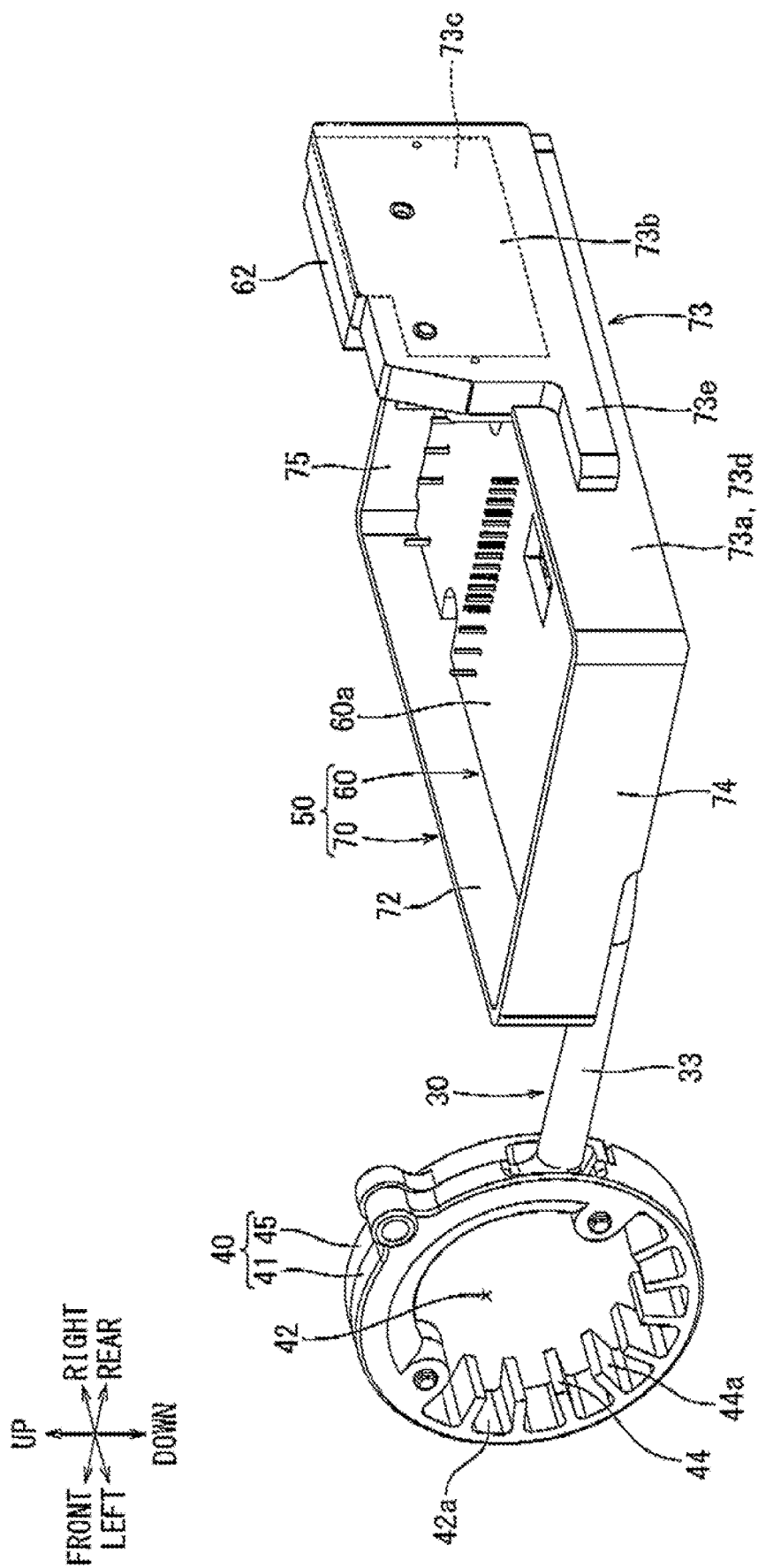
FIG. 6 is an enlarged view of a heat sink, a heat pipe, and a controller shown in FIG. 2.
Figure 12:
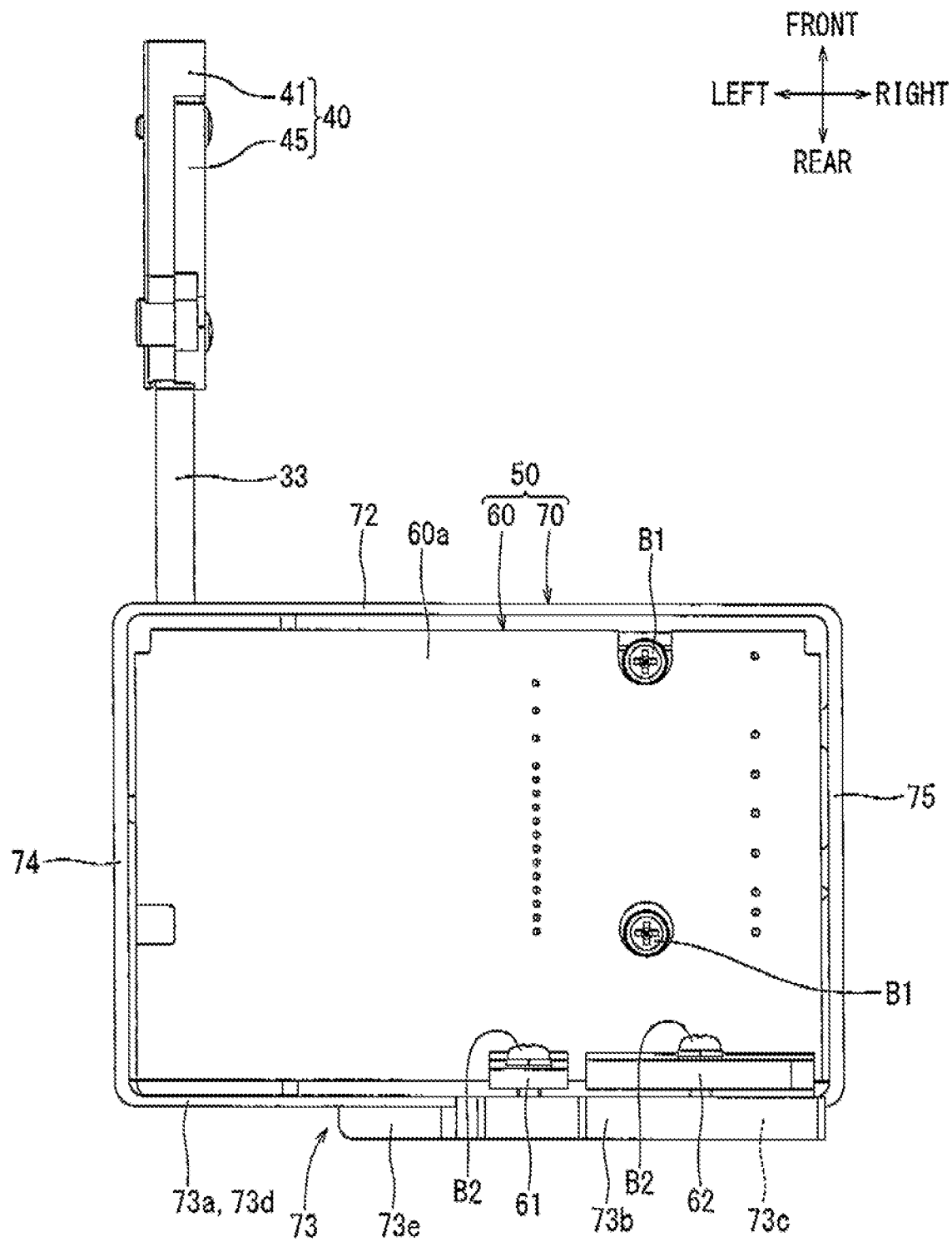

FIG. 12 is a plan view of FIG. 6.

Figure 13:
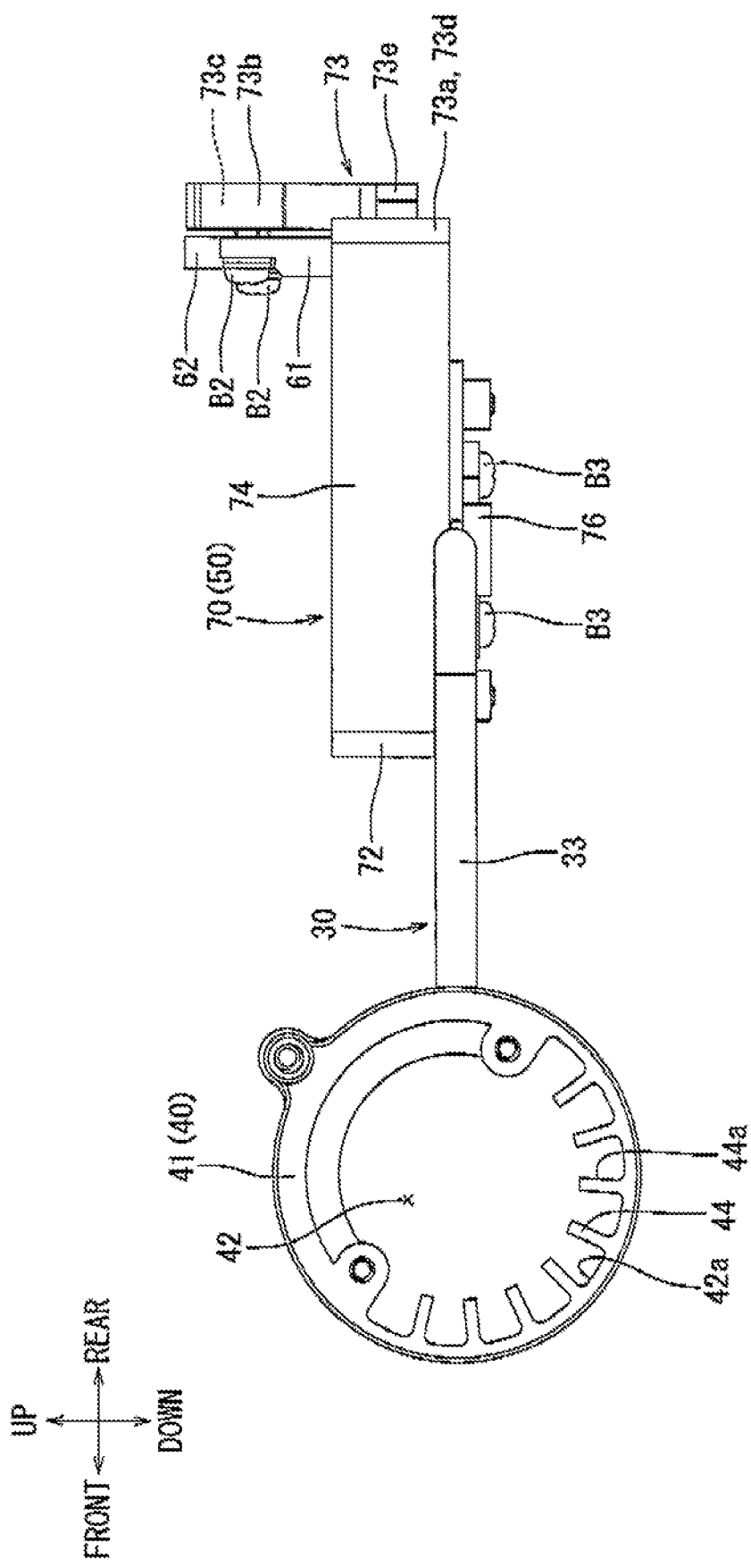

FIG. 13 is a left side view of FIG. 6.

Figure 14:
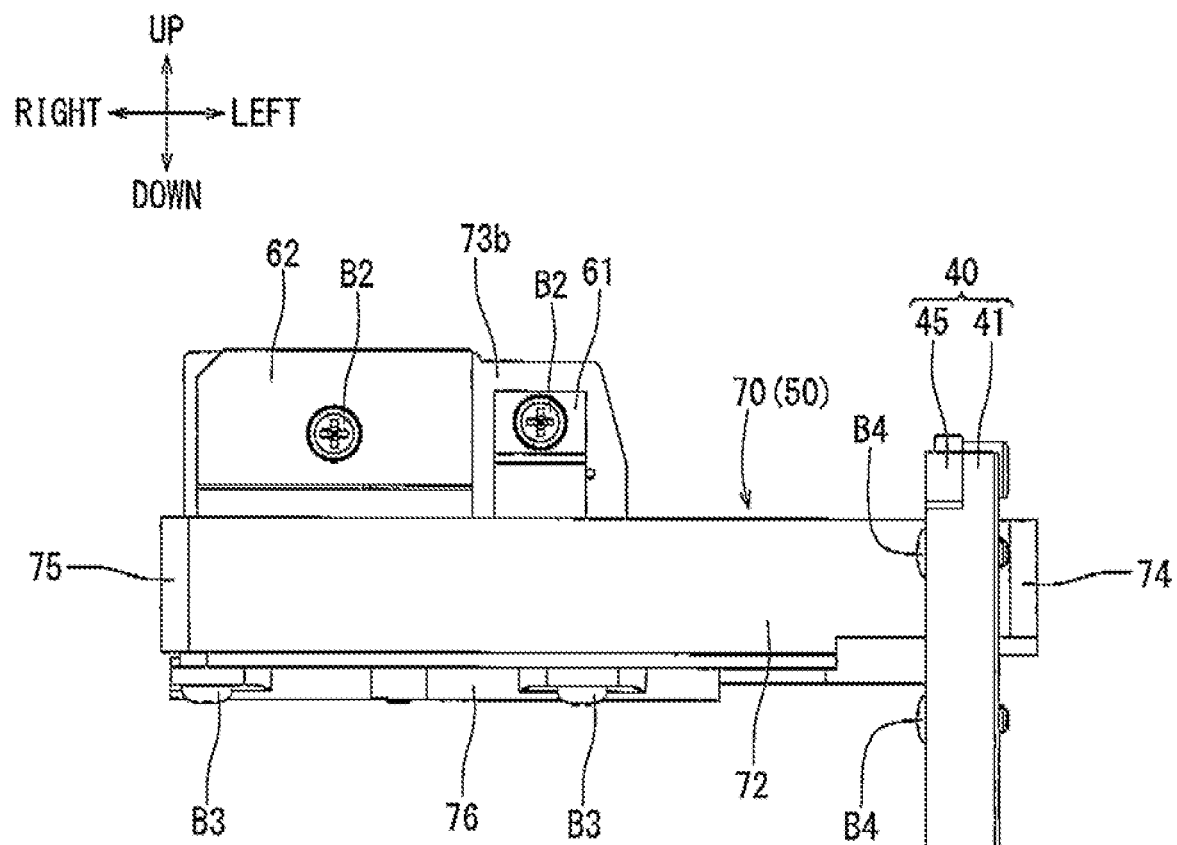

FIG. 14 is a front view of FIG. 6.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring significant aspects of the exemplary embodiments presented herein.

Representative, non-limiting embodiments according to the present disclosure will be described with reference to FIGS. 1 to 14. As an example of an electric power tool 1 embodied in the present disclosure, a so-called portable circular saw which may be used for cutting work performed by rotation of its circular cutting blade is shown in the figures. As shown in FIGS. 1 to 5, the electric power tool 1 of the present embodiment may include a base 2, a tool main body 10 that is supported on the upper surface of the base 2, a motor 20 serving as a drive source provided in the tool main body 10, a spindle 26 that is driven by a rotor shaft 21 of the motor 20, and a circular saw blade 12 that is attached to the spindle 26. As shown in the figures and explained below, a cutting/advancing direction (a direction in which the saw blade 12 cuts into a workpiece W) is referred to as a front side (the left side in FIG. 3 as seen when the figure is viewed, corresponding to the front side of the legend). A user (not shown) may be positioned at the rear of the electric power tool 1 (the right side in FIG. 3 as seen when the figure is viewed, corresponding to the rear side of the legend). The orientation of directions recited as up, down, left, right, front, and rear is relative, and is based on the user's position.

As shown in FIGS. 1 to 5, the electric power tool 1 may be provided with the circular saw blade 12 that rotates when the motor 20 that is discussed infra is driven. The saw blade 12 may be provided such that the cutting/advancing direction of the saw blade 12 is in the frontward direction. The upper half circumferential periphery of the saw blade 12 may be covered with a blade case 13. A void arrow (not shown) may be depicted on a lateral side of the blade case 13 showing a rotational direction of the saw blade 12 to the user (a clockwise direction in FIG. 3).

Figure 3:
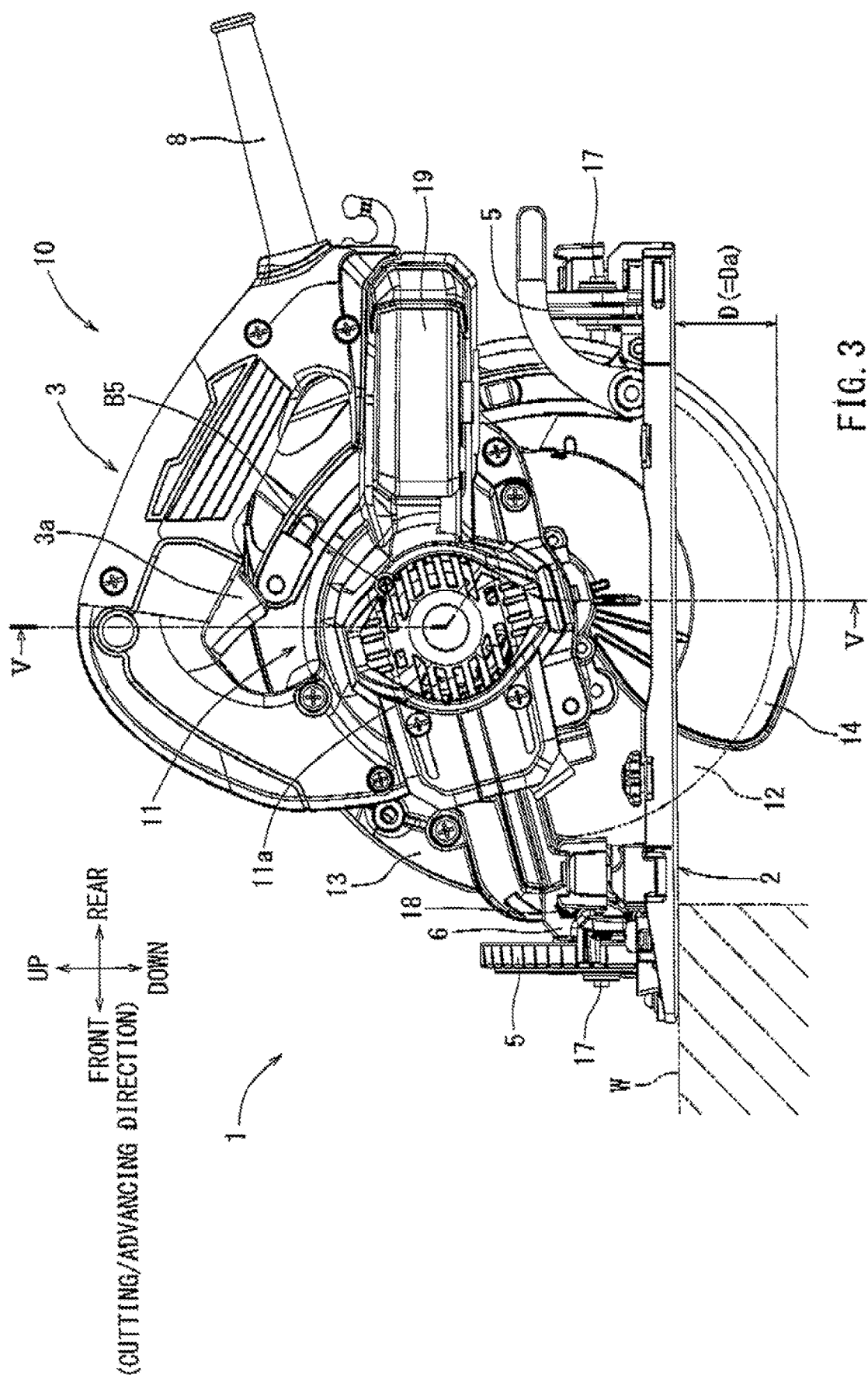
FIG. 3 is a left side view of the portable circular saw shown in FIG. 1.
Figure 4:
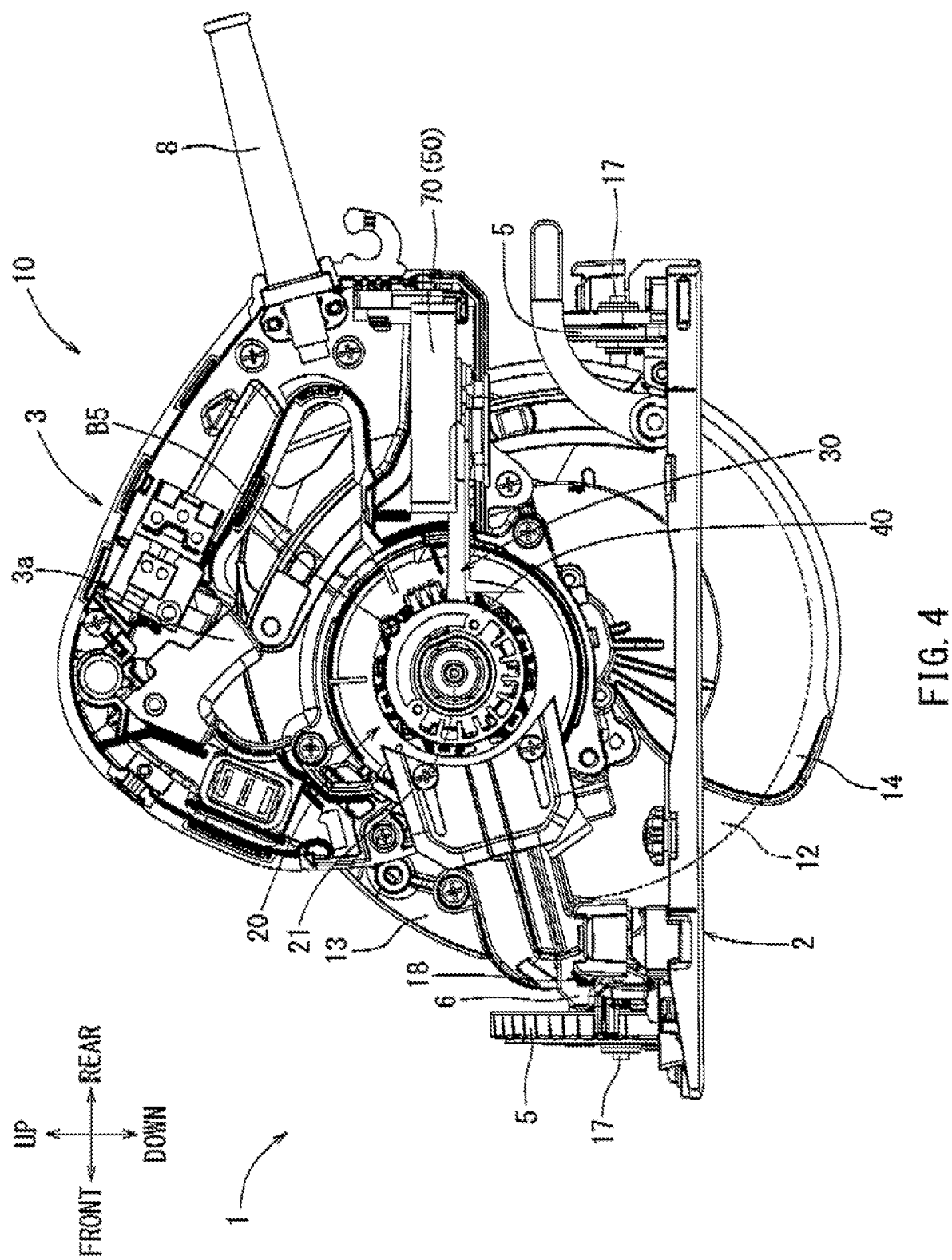
FIG. 4 is the portable circular saw showing a state where the motor housing is removed in FIG. 3.

The lower half circumferential periphery of the saw blade 12 may be at least partially exposed, and may protrude downwards from the base 2. This exposed, protruding portion of the saw blade 12 is able to cut into a desired material (workplace W) to perform a cutting task. The lower half circumferential periphery of the saw blade 12 may also partially be covered by a movable cover 14 that can open/close in the circumferential peripheral direction of the saw blade 12, depending on its contact with the workpiece W. In particular, when a front end portion of the movable cover 14 is brought into contact with the workpiece W to move the electric power tool 1 forward in the front direction, the movable cover 14 may open upward in the counterclockwise direction as shown in FIG. 3, which exposes the saw blade 12 commensurately by the amount the movable cover 14 is opened, as the tool 1 moves forward and the movable cover 14 opens further. Subsequently, the cutting task can be performed by the exposed saw blade 12.

As shown in FIGS. 1 to 5, a gear case 7 may be provided integrally with a blade case 13 on the left side thereof. A reduction gear train 25 may be housed within the gear case 7. A motor housing 11 may be connected to the left side of the gear case 7. A handle 3 may be provided above a connection portion between the motor housing 11 and the gear case 7. The handle 3 may approximately have the shape of an upward facing D-shaped loop such that it roughly extends parallel to the front-to-rear direction and has a through hole in its interior in the left-to-right direction. A trigger-type switch lever 3a may be provided on the inner peripheral circumferential surface of the handle 3. When the user pulls the switch lever 3a upward, said pulling action may start the motor 30, and in turn rotate the saw blade 12. Conversely, when the user stops pulling the switch lever 3a, both the motor 30 and the saw blade 12 may stop. A power cord 8 for supplying electric power to the electric power tool 1 may be provided so as to extend from the rear end of the handle 8 in the rearward direction.

Figure 5:
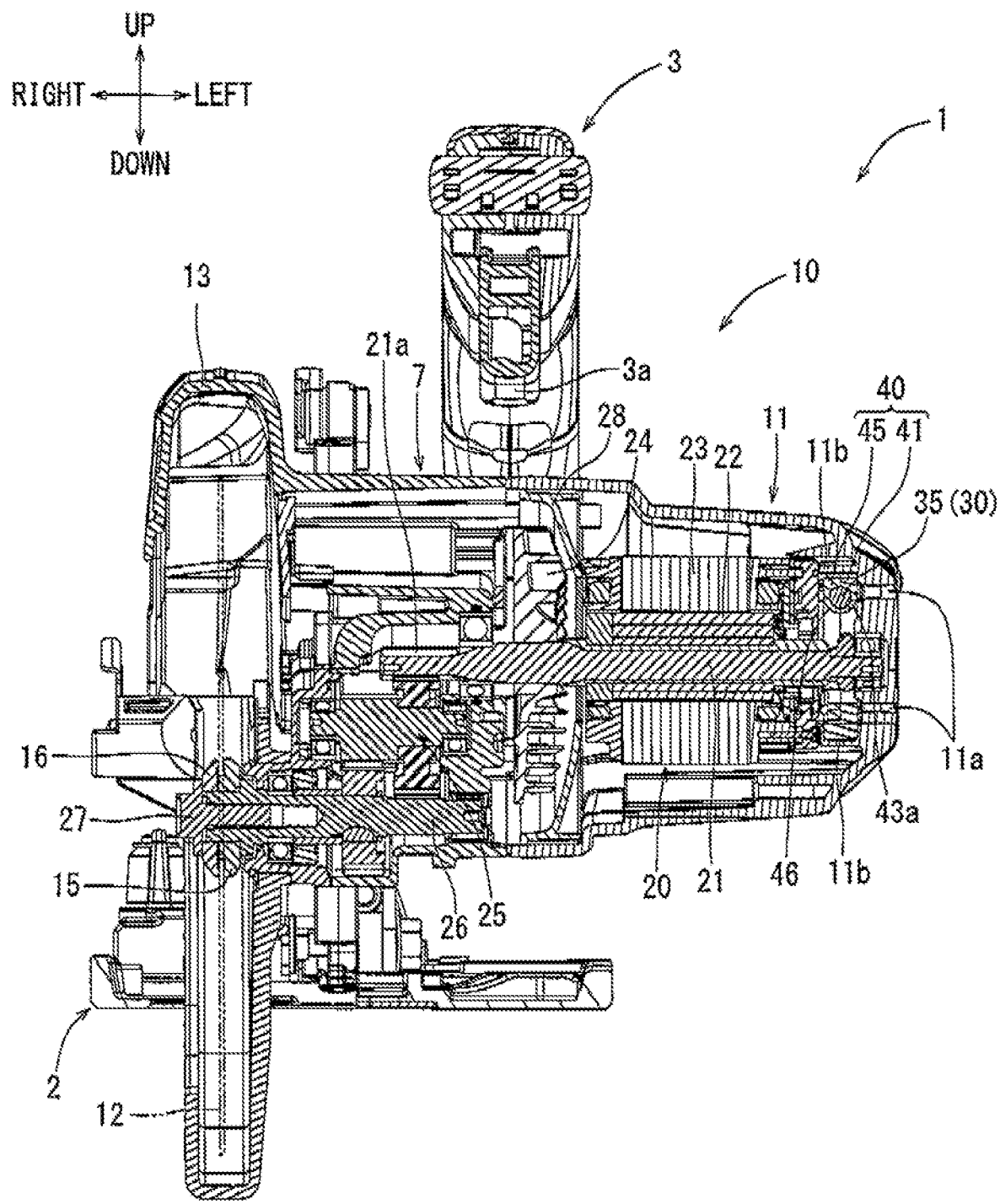
FIG. 5 is a cross-sectional view taken along line V-V of FIG. 3.

As shown in FIG. 5, when the blade surface of the saw blade 12, which extends in the up-down and front-rear directional plane, is perpendicular to the base 2 extending in the front-rear and left right directional plane, a so-called perpendicular cutting can be performed. However, in addition to said perpendicular configuration, the tool main body 10 of the electric power tool 1 may also be tilted in the left-to-right direction with respect to the base 2 around a left-to-fight tilt shaft 17, which results in the blade surface also being tilted by the same amount. By tilting the tool main body 10 in the left-to-right direction, resulting in the tilting of the blade surface of the saw blade 12 in the left-to-right direction with respect to the base 2, a so-called oblique cutting can be performed.

As shown in FIGS. 1 to 4, an angular plate 5 may be provided integrally with the base 2 located extending upward from the front upper surface portion of the base 2. A tilt bracket 6 may be attached to the rear side of the angular plate 5. The tilt bracket 6 may be supported by the angular plate 5 via the left-to-right tilt shaft 17 such that it can also be tilted in the left-to-right direction along with shaft 17, by the same amount. A front end portion of the blade case 13 of the tool main body 10 may be attached to the tilt bracket 6 such that it is independently tiltable in the up-to-down direction via an up-to-down tilt shaft 18. Because of this configuration, the tool main body 10 may be separately tiltable with respect to the base 2 not only in the left-to-right direction but also in the up-to-down direction, by differing amounts in each direction. There may be a plurality of angular plates 5, where in addition one integral angular plate 5 being provided at the upper front surface portion of base 2 as described, another integral angular plate 5 may also be provided integrally with the base 2, extending upwards from the upper surface of the base 2, at the rear upper surface of the base 2. Because of this configuration, the tool main body 10 may be supported via the left-to-right tilt shaft 17 so as to be tiltable in the left-to-right direction, not only at the front of the base 2 but also at the rear of the base 2. Furthermore, with the up-to-down tilting feature, by changing the height of the tool main body 10 with respect to the base 2, a protruding length of the saw blade 12 protruding from the low surface of the base 2 in the downward direction may be changed. Because of this configuration, a cutting depth D of the saw blade 12 with respect to the workpiece W can be adjusted. When the tool main body 10 is disposed at its lowest position relative to the base 2 via the up-to-down tilt shaft 18, the cutting depth D in this position may be the maximum cutting depth Da (refer to FIG. 3, showing the lowest position of tool main body 10).

As shown in FIG. 5, the motor 20 may be housed in the motor housing 11. A brushless motor operated by AC power (ACBL motor) may be used as the motor 20. The rotor shaft 21 of the motor 20 may extend in the left-to-right direction and be supported by the motor housing 11 in a rotatable manner, such that it can rotate about its longitudinal axis. A rotor 22 may be provided circumferentially around the rotor shaft 21 such that it rotates synchronously with the rotor shaft 21. A stator 23 may be fixed to the motor housing 11, wherein the inner peripheral radial surface of the stator 23 faces the outer peripheral radial surface of the rotor 22 in the radial direction of the rotor shaft 21, where inward and outward describe the radial direction relative to said shaft 21.

As shown in FIG. 5, a cooling fan 24 may be attached to the rotor shaft 21 on the right side of the rotor 22 and the stator 23 such that the cooling fan 24 is tightly circumferentially fitted around, and rotates synchronously with, the rotor shaft 21. The cooling fan 24 may be centrifugal fan. A plurality of intake ports 11a may be provided on the left side of the motor housing 11. Furthermore, a plurality of exhaust ports (not shown) may be provided on the motor housing 11 circumferentially around the cooling fan 24. The holes of the intake ports 11a of the cooling fan 24 (at the left side of the cooling fan 24 and at the left portion of motor housing 11) and also the holes of the exhaust port of the cooling fan 24 (outside in the radial direction) may be covered with a baffle plate 28.

As shown in FIG. 5, a drive gear 21a may be provided at the right end of the rotor shaft 21. The spindle 26 may be rotatably supported below an extension of the axis of the rotor shaft 21, extending parallel to the rotor shaft 21 in the left-to-right direction. Rotation of the rotor shaft 21 may be reduced in two stages, via the drive gear 21 and the reduction gear train 25, respectively, and then transmitted to the spindle 26. A tight end portion of the spindle 26 may protrude to such an extent in the tight direction that it extends into the interior of the blade case 13. The saw blade 12 may be attached to said protruding portion of the spindle 26 within the blade case 13 such that it is firmly held between an inner flange 15, to the left of the blade 12, and an outer flange 16, to the right of the blade 12, in the left-to-light longitudinal axial direction of the spindle 26. The inner flange 15 and the outer flange 16 may be tightened to the spindle 26 by a bolt 27. Because of this configuration, the saw blade 12, which as described is supported in the left-to-right direction between the two flanges, may be supported such that it lies securely on, and rotates synchronously with, the spindle 26.

Figure 7:
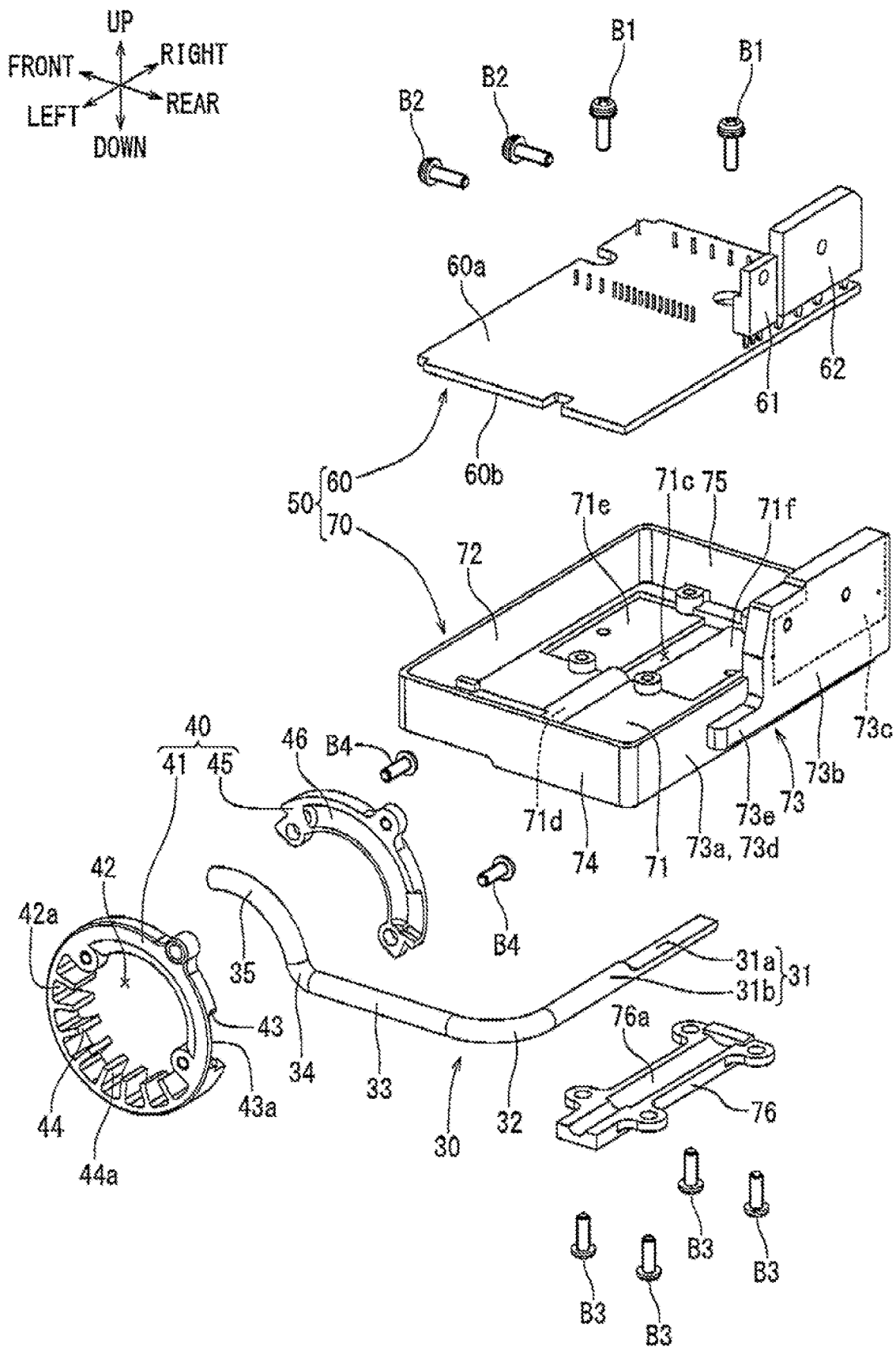
FIG. 7 is an exploded perspective view of FIG. 6.
Figure 8:
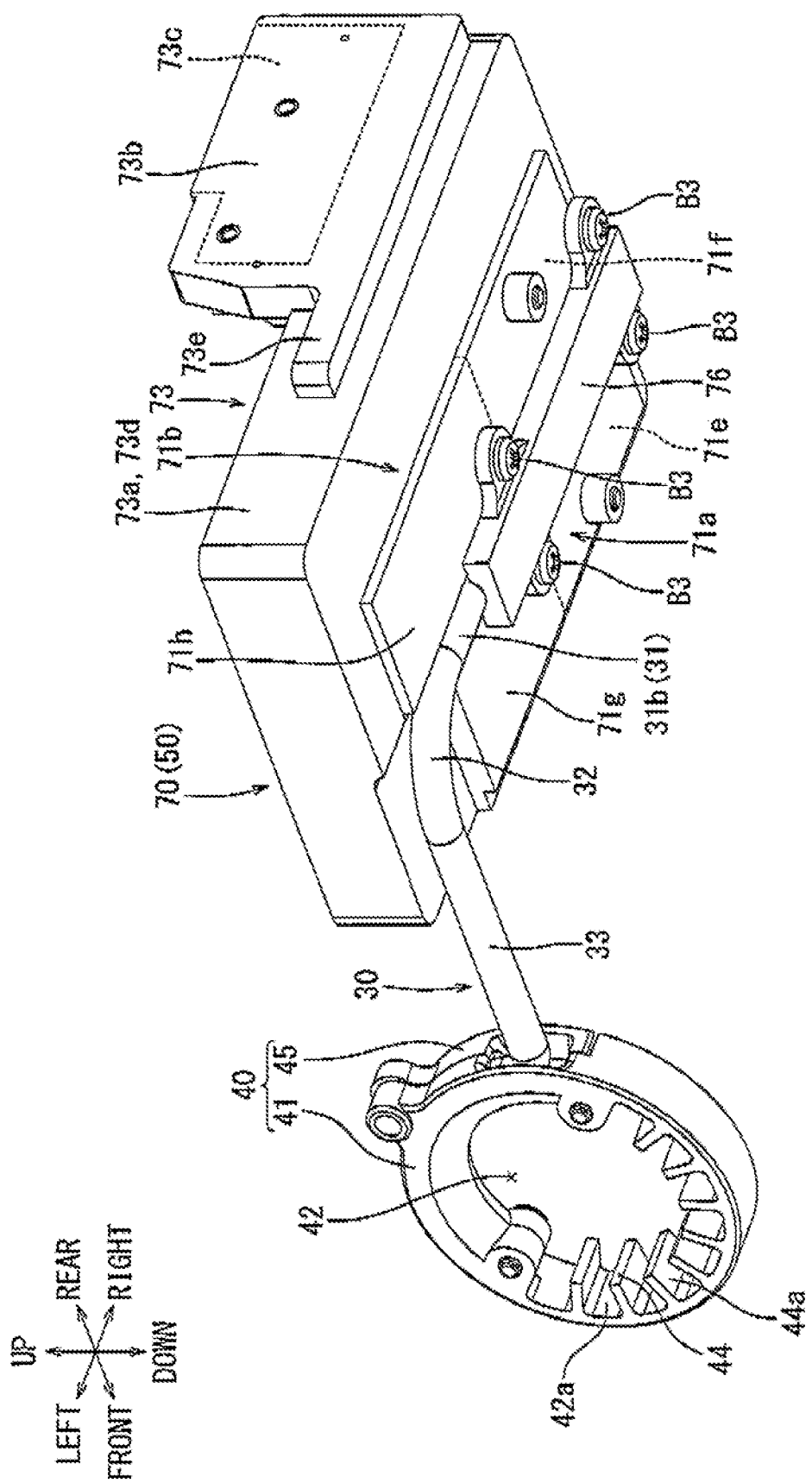
FIG. 8 is an enlarged view of the heat sink, the heat pipe, and the controller shown in FIG. 2 viewed from below.

A heat pipe 30 present in the proximity of the intake ports 11a may be a heat transport device made of copper. As shown in FIGS. 6 to 10, the heat pipe 30 may take the form of different shapes such as, for example, an approximately S-shape form as shown in FIG. 7, according to its arrangement position relative to the other components. In this embodiment, as shown in FIG. 7, the heat pipe 30 may be in a tubular shape and includes a first linear member 31 extending in the right-to-left direction, a second linear member 33 extending in the rear-to-front direction via a first bent portion 32 that is curved at an approximately right angle from a left end portion of the first linear member 31 toward a rear end portion of the second linear member 33, and a terminal circular arc member 35 that is curved upwards at an approximately right angle via a second bent portion 34 from a front portion of the second linear member 33 toward a point upwards and frontwards of said front portion.

As to the internal structure of the heat pipe 30, it is as follows. The heat pipe 30 may include an inner layer called a wick, which is provided with a plurality of nets, inside an outer layer made of copper. A liquid heat transport medium such as, for example, water may be sealed in the interior of the heat pipe 30. When one end of the heat pipe 30, i.e., the first linear member 31 (heated portion) receives heat, the heat transport medium (water) may evaporate. The evaporated heat transport medium (water) may move to the other end of the heat pipe 30, i.e., the circular arc member 35 (heat dissipation portion). The heat transport medium (water) that dissipates heat at the circular arc member 35 may liquefy. The liquefied heat transport medium (water) may then move back from the circular are member 35 to the first linear member 31 by capillary action. By disposing the first linear member 31 below the circular arc member 35, the heat transport medium (water) that is evaporated and converted into vapor, moves upwards from the first linear member 31 to the circular arc member 35, thereby increasing the speed of the heat transportation.

Furthermore, conversely, by disposing the first linear member 31 below the circular arc member 35, the liquefied heat transport medium (water) may move downwards from the circular are member 35 to the first linear member 31 automatically by the force of gravity, thereby also increasing the speed of the heat transportation. In other words, by disposing one end of the heat pipe 20 at a heat generation source and the other end of the heat pipe 20 at a heat dissipation source, and then disposing the heat generation source below the heat radiation source, a rapid and effective heat transport may be performed between the heat generation source and the heat dissipation source, in a bi-phase, bi-directional manner through the heat pipe 50, where the vapor phase travels upward and toward the front and the liquid phase travels downward and toward the rear. In the electric power tool 1 according to the present embodiment, the first linear member 31 may be attached to a controller 50 and the circular arc member 35 may be assembled to a heat sink 40. The first linear member 31 of the heat pipe 20 may be located at the heat generation source and the circular art member 35 may be located at the heat dissipation source. The controller 50 and the heat sink 40 will be discussed infra.

Furthermore, a right half portion of the first linear member 31 of the heat pipe 30 may be formed such that its upper side is formed as a lower hemispherical shape, with a flat upper surface. In more detail, as shown in FIG. 7, the right half portion of the first linear member 31 of the heat pipe 30 may have a plane portion 31*a* representing said flat upper surface, of the upward facing semicircular cross-section of the right half of first linear member 31 in the front-rear up-down directional plane. In contrast, a left-half portion of the first linear member 31 of the heat pipe 30 may be a general portion 31*b* having a full circular tubular shape without the forming of the plane portion 31*a*. High heat conductive grease (for example, THERMAL JOINT (product name) made by KATAOKA SENNZAI CO., LTD.) may be applied to the first linear member 31 and the circular arc member 35 of the heat pipe 30. By applying this heat conductive grease to the heat pipe 30, a heat insulation layer such as air etc. with respect to mated members that are connected to the heat pipe 30 can be reduced and/or eliminated. The mated members may be a heat sink 40, an IPM (Integrated Power Module) 63, a bottom wall 71 of a controller case 70, and a cover 76 etc., which are discussed infra. Because of this application of grease, contact thermal resistance generated between the heat pipe 30 and the mated members can be suppressed, thereby improving heat transport effect (heat soaking effect) of the heat pipe 30.

Next, referring to FIGS. 6 to 10, the heat sink 40 will be explained in detail. The heat sink 40 may include a heat sink main body 41 and a cover member 45, both of which are made of aluminum The heat sink main body 41 may be formed in an annular shape having an interior hole 42 extending in the left-to-right direction. The cover member 45 may cover a cutout 43 that is firmed extending rightward from in the circumferential periphery of the heat sink main body 41. A plurality of fins 44 may be formed on the inner peripheral circumferential boundary of interior hole 42 of the heat sink main body 41. The plurality of fins 44 may be formed such that each fin surface 44*a* of the fins 44 extends radially inwards toward the longitudinal direction of the rotor shaft 21 of the motor 20. Furthermore, a mew groove 43*a* may be formed on an inner surface of the cutout 43 of the heat sink main body 41, having a semicircular cross section, facing rightward in the up-down front-rear directional plane, may form a complementary-fit configuration with the left half portion of the circular are member 35 of the heat pipe 30.

Furthermore, a recess groove 46 having a semicircular cross section facing leftward in the up-down front-rear directional plane, into which the right half portion of the circular arc portion 35 of the heat pipe 30 may complementarily fit, may be formed on an inner surface of the cover member 45. Because of this configuration, the circular arc member 35 of the heat pipe 30 may be inserted into both the recess grooves 43*a* and 46. The circular arc member 35 of the heat pipe 30 may be firmly secured in the left-to-right direction between the heat sink 41 and the cover member 45 without needing to increase the thickness of the heat sink 40.

In the heat sink 40, the plurality of fins 44 may be formed extending radially inward over approximately half of the entire circumference of the heat sink main body 41. Furthermore, the recess groove 43*a* (a connection area of the heat pipe 30) may be formed over approximately another half of the entire circumference of the heat sink main body 41.

Next, referring to FIGS. 6 to 10, the controller 50 will be explained below. The controller 50 may generally include a rectangular electric circuit board 60 and a rectangular box-shaped controller case 70 that houses the electric circuit board 60. A control circuit including the IPM 6 that includes a microprocessor for controlling driving of the motor 20, an FET 61 for switching current of the motor 20, and a drive circuit including a diode bridge 62, among other components, may be mounted on the electric circuit board 60. As shown in FIG. 7, the FET 61 and the diode bridge 62 may be mounted along the edge of the electric circuit board 60 on the rear right corner of the electric circuit board's upper surface 60*a*.

Figure 9:
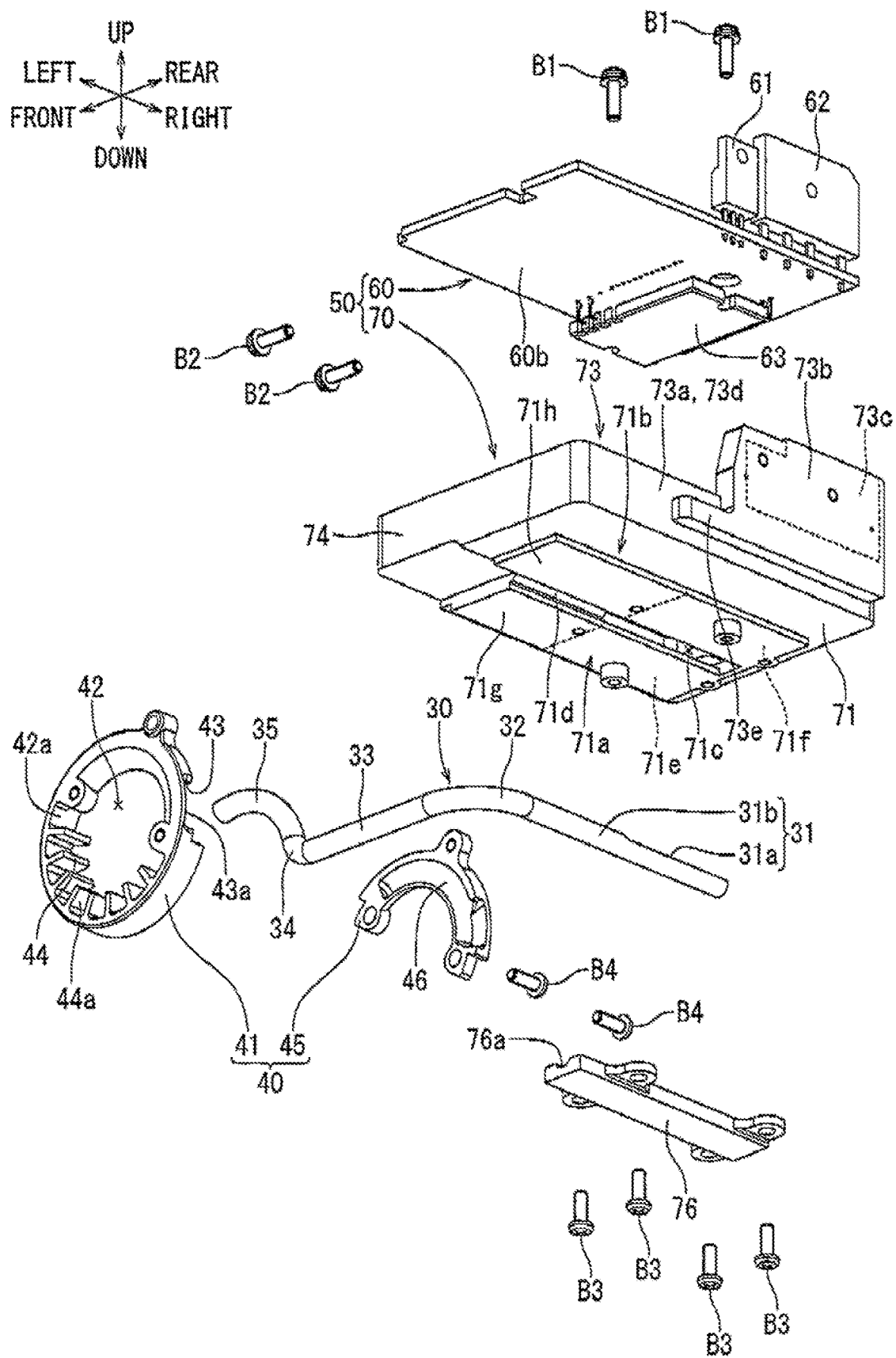
FIG. 9 is an exploded perspective view of FIG. 8.

The FET 61 and the diode bridge 62 are heat-generating components, and through their operation in the control circuit, may generate heat by themselves. Consequently, the electric circuit board 60, and thus the controller 50 may also generate heat Furthermore, as shown in FIG. 9, the IPM 63 may be mounted to the bottom of the electric circuit board 60, on the front right side of the board's underside surface 60*b*. The IPM 63 may not generate heat to a large extent. However, because its heat resistant temperature is low, it may also be necessary to cool the IPM 63. The electric circuit board 60 may be configured as described above.

The controller case 70 may be formed in a rectangular box shape having a bottom wall 71, a front wall 72, a rear wall 73, a left wall 74, and a right wall 75. A front projection portion 71*a* of the case 70 may be formed in a raised manner on the front side of the outer surface of the bottom wall 71 (refer to FIGS. 8 and 9). Furthermore, a rear projection portion 711*a* may be formed in a raised manner on the rear side of the outer surface of the bottom wall 71. A rectangular space 71*c* in between the front projection portion 71*a* and the rear projection portion 71*b* in the front-to-rear direction, which extends upward through the entirety of the bottom wall 71, may be formed on the right side of the said wall 71. Furthermore, a groove portion 71*d* having a semicircular cross section in the front-rear up-down directional plane, facing downward, may be formed on the left side, underside surface of the bottom wall 71, aligned with the space 71*c* in the right-to-left direction, between the front projection portion 71*a* and the rear projection portion 71*b* (refer to FIGS. 7 and 9).

Furthermore, a downwardly recessed portion 71*e* may be formed on the front right side of the inner surface of the bottom wall 71 (refer to FIG. 7). Also, a recessed portion 71*f* may be formed on the mar right side of the inner surface of the bottom wall 71. Because of this configuration, since as shown in the exploded view in FIG. 9 the position of the IPM 63 corresponds to the space above the recessed portions 71*f* and 71*e*, with empty space 71*c* in between, the IPM 63 may be disposed within the downwardly recessed region formed by said recessed portions 71*f* and 71*e*, and may lie below a general surface of the bottom wall 71. As described above, the recessed portion 71*e* may be formed only on the front right side of the inner surface of the bottom wall 71. Because of this configuration, the front left side of the bottom wall 71 may be a thick wall portion 71*g* (refer to FIG. 9). Furthermore, as described above, the recessed portion 71*f* may be formed only on the rear right side of the inner surface of the bottom wall 71. Because of this configuration, the rear left side of the bottom wall 71 may be a thick wall portion 71h. Thus, the groove portion 71d may be formed along the thick wall portions 71g and 71h. Consequently, the general portion 31b of the heat pipe 30, which is discussed infra, may fit complementarily into the downward facing semicircular groove formed by 31b, and would thus be disposed between the thick wall portions 71g and 71h (refer to FIG. 8).

Furthermore, the right side of the rear wall 73 may abut heat dissipation members (not shown; for example, heat radiation plates) of the FET 61 and the diode bridge 62 mounted on the electric circuit board 60 as discussed infra. Thus, the right side of the rear wall 73 may become a high temperature portion 73c caused by dissipating heat generated by the FET 61 and the diode bridge 62 (refer to FIGS. 6-9). in contrast, a remaining portion of the rear wall 73, aside from the high temperature portion 730 may not abut the PET 61 and the diode bridge 62, and thus this region may delineate a low temperature portion 73d that is not affected by the heat generated by the FET 61 and the diode bridge 62. The rear wall 73 may be configured such that a general portion 73a with general thickness corresponds to the low temperature portion 73d and a substantially thicker wall portion 73b corresponds to the high temperature portion 73e. For example, the general portion 73a may be approximately 1 to 3 mm in thickness and the thick wall portion 73b may be approximately 3 to 5 mm in thickness.

The thick wall portion 73b may extend by au extension portion 73e from the high temperature portion 73c to the low temperature portion 73d of the rear wall 73. When heat generated by the FET 61 and the diode bridge 62 is applied to the thick wall portion 73h, the applied heat dissipates to the general portion 73a according to heat uniformity across the length of 73e. In other words, heat applied to the thick wall portion 73b may be absorbed and dissipated across the general portion 73a. The controller 70 may be made of aluminum alloy (for example, HT-1 (a product name) made by YAMAZAKI DIECAST CO., LTD.) Because aluminum alloy has excellent moldability and castability, the controller 70 may be formed in a desired shape and also reduction in weight may be obtained. Thermal conductivity of aluminum alloy is 169 to 178 W/mK. The controller case 70 may be configured as described above.

The electric circuit board 60 may be assembled to the controller case 70 by use of two first screws B1 (refer to FIGS. 6 and 7). By using the first screws B1, the electric circuit board 60 housed in the controller case 70 may be securely retained. When the electric circuit board 60 is mounted to the controller case 70 in such a manner, the heat radiation members of the PET 61 and the diode bridge 62 mounted on the electric circuit board 60 may contact the thick wall portion 73b of the rear wall 73 of the controller case 70. Furthermore, the heat radiation members of the FET 61 and the diode bridge 62 may be finally affixed to the thick wall portion 73b of the rear wall 73 of the controller case 70 by second screws B2. Because of this configuration, each of the heat radiation members of the FET 61 and the diode bridge 62 may be firmly held in a state where they contact the thick wall portion 73b of the rear wall 73 of the controller case 70. Furthermore, a heat dissipation member (not shown; for example a heat radiation plate) of the IPM 63 mounted on the controller case 70 may contact the recessed portions 71e and 71f of the bottom wall 71 of the controller case 70. The controller 50 may be configured as described above.

The first linear member 31 of the heat pipe 30 may be connected to the controller 50 (refer to FIGS. 6 to 14). This connection Can be performed such that the first linear member 31 of the heat pipe 30 is held vertically between the bottom wall 71 of the controller case 70 and the semicircular upward-facing cover 76, and then to secure this attachment and affix the linear member 31 of the heat pipe 30 to the case 70, four corners of the cover 76 are fixed to the underside of bottom wall 71 of the controller case 70 by use of four third screws 133 (refer to FIGS. 7 and 9). In other words, the upper flat plane portion 31a of the first linear member 31 of the heat pipe 30 that surface-contacts the IPM 63 may be covered on its bottom by the cover 76 that is fixed to the controller case 70 by the third screws B3. As shown in FIG. 11, the flat upper surface plane portion 31a of the first linear member 31 of the heat pipe 30 may be held in a mariner where its upper surface abuts and/or in contact with the lower basal surface of the IPM 63 mounted on the electric circuit board 60, via the space 71c. Similarly to the controller 70, the cover 76 may be made of aluminum alloy. Thus, the cover 76 can be formed in a desired shape because of its excellent moldability and castability, and also reduction in weight may be obtained.

Furthermore, the general portion 31b of the first linear member 31 of the heat pipe 30, which is held between the bottom wall 71 and the cover 76, may be inserted vertically between the recessed portion 71d of the bottom wall 71 having a semicircular cross section facing downward as seen in FIG. 7, and the recessed portion 76a of the cover 76 having a semicircular cross section acing upward. Because of this configuration, the first linear member 31 of the heat pipe 30 may be held between the controller 50 and the cover 76 without needing an increase a thickness of the connection portion. As described above, the heat pipe 30 thus abutting and/or surface-contacting the bottom basal surface of the IPM 63 may be covered with the cover 76 fixed to the controller case 70 by four third screws B3. In this way, the first linear member 31 of the heat pipe 30 may be connected to the controller 50.

The circular are member 35 of the heat pipe 30 may be connected to the heat sink 40. This connection can be performed such that the circular arc member 35 of the heat pipe 30 is held in the front-to-rear direction between the rightward facing semicircular groove 43a of the heat sink main body 41 of the heat sink 40 and the leftward facing semicircular groove 46 of the cover member 45, and then both corners of the cover member 45 are fixed to the heat sink main body 41 of the heat sink 40 by use of two fourth screws 134. In this way, the cover member 45 can be fixed to the heat sink main body 41 by two fourth screws 134 without generating a gap. When the circular arc member 35 of the heat pipe 30 is connected to the heat sink 40 in this manner, the heat sink main body 41 of the heat sink 40 may be temporarily pre-fixed to the motor housing 11.

Because of the configuration of circular arc member 35 as described, said member of the heat pipe 30 can be held between the heat sink main body 41 and the cover member 45 without needing an increase in thickness of the connection portion. In this way, the circular arc member 35 of the heat pipe 30 may be connected to the heat sink 40. In other words, the IPM 63 mounted on the electric circuit board 60 of the controller 50 may be connected to the heat sink 40 through the heat pipe 30. The IPM 63 may not generate heat to a large extent, but it still may be necessary to cool the IPM 63. Because of this, the 63 may correspond to the high temperature portion of the controller 50. The heat sink 40 may be cooled by outside air as discussed infra. Because of this cooling action, the heat sink 40 may correspond to the low temperature portion of the tool main body 10.

As described above, the heat sink. 40 may be formed in an annular shape having the interior hole 42. Because of this configuration, the heat sink 40 may be housed and assembled in the motor housing 11 that houses the motor 20 by use of a fifth screw 135 such that an anti-load side of the rotor shaft 21 of the motor 20 penetrates (passes through) the radial interior of the interior hole 42, where said hole forms the radial interior of heat sink 40 (refer to FIGS. 1 to 2, FIG. 5). The heat sink 40 housed in the motor housing 11 may be securely held and positioned in a circumferential direction by a plurality of ribs 11b projecting from an inner surface of the motor housing 11. Because of this configuration, though the heat sink 40 is assembled only by the fifth screw B5, the heat sink 40 may be housed in the motor housing 11 without rattling. In this way, the heat sink 40 may be disposed around the anti-load side of the rotor shaft 21 of the motor 20. In other words, the heat sink 40 may be disposed between the motor 20 and the intake port 11a of the motor housing 11 in the right-to-left direction.

Figure 1:
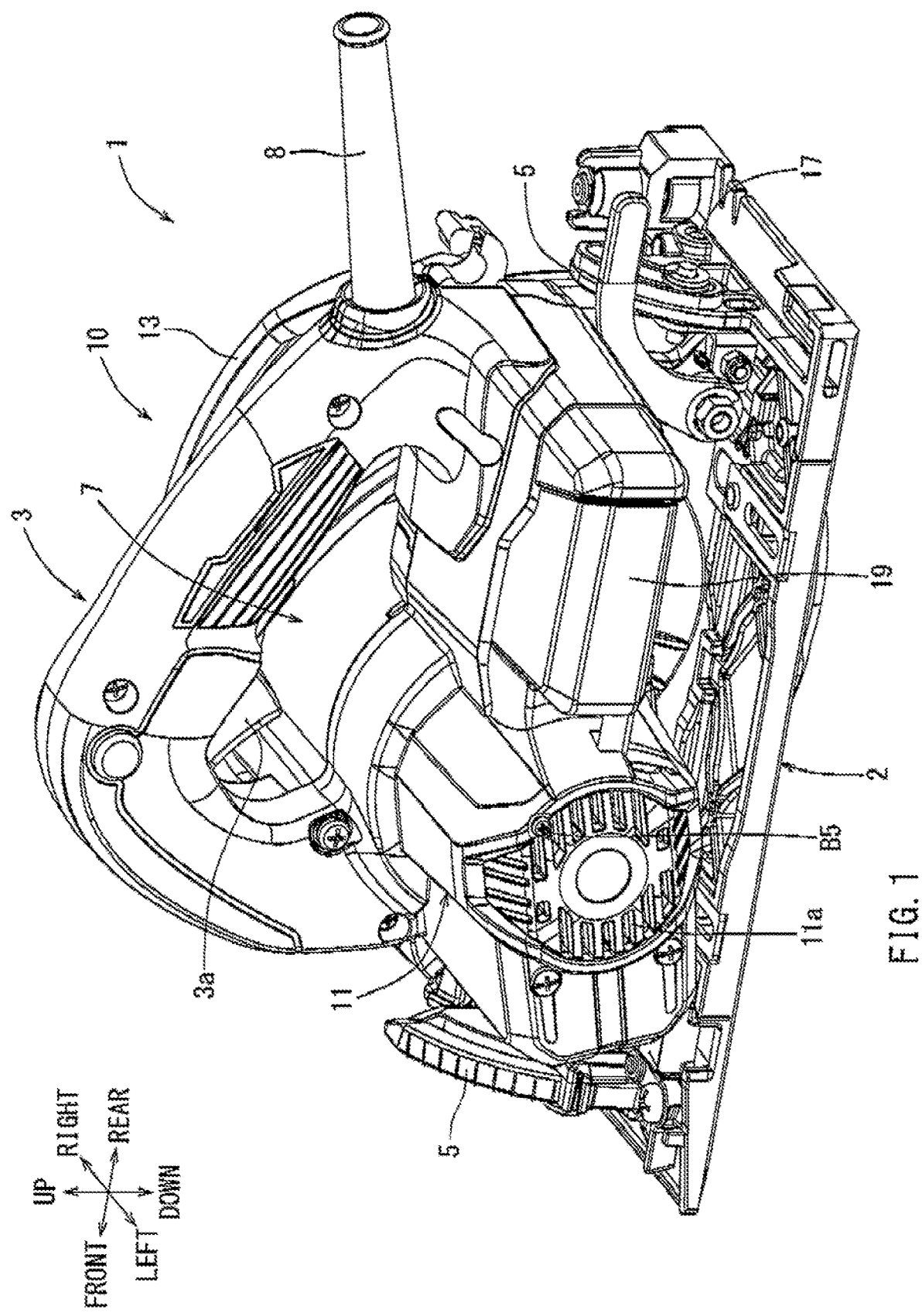
FIG. 1 is an overall perspective view of a portable circular saw according to an exemplary embodiment of the present disclosure.

As shown in FIGS. 1 and 2, the controller 50 may be housed in a contained controller housing case 19 that is provided at the rear of the motor housing 11. The controller housing case 19 may have enough space to house the entirety of the controller 50, extending behind the motor 20 to a large extent. An interior of the controller housing case 19 may communicate with an interior of the motor housing 11 through an opening (not shown) that is large enough to pass through at least the heat pipe 30 and electric wires (not shown) connected to the electric circuit board 60. When a cutting work is performed in a state where the tool main body 10 is positioned such that the cutting depth D of the saw blade 12 becomes the maximum cutting depth Da as shown in FIG. 3, the first linear member 31 (heated portion) of the heat pipe 30 may be disposed in a position so as to be lower than the circular arc member 35 (heat dissipation portion) of the heat pipe 30. Because of this configuration, when the tool main body 10 is operated at the maximum cutting depth Da, heat transfer from the heated portion (the first linear member 31) to the heat dissipation portion (the circular arc member 35) may be performed by the heat pipe 30, through evaporation, in a rapid and efficient manner.

Though not shown in the figures, when the tool main body 10 is moved upwards such that the cutting depth D of the saw blade 12 is reduced to about approximately 50% of the maximum cutting depth Da, the first linear member 31 (heated portion) may be at the same height the circular are member 35 (heat dissipation portion). In other words, when the user generally uses the electric power tool 1 in such a manner that the cutting depth of the saw blade 12 is disposed in a range from a position where it becomes the maximum cutting depth Da as shown in FIG. 3 to a position where it becomes approximately 50% of the maximum cutting depth Da, a heat-transfer state may be maintained, where heat transfer from the first linear member 31 to the circular arc member 50 is performed in a rapid and efficient manner.

Next, a flow of the cooling air in the interior of the motor housing 11 and a procedure to cool the controller 50 will be explained below. As shown in FIG. 5, the outside air (cooling air), which is introduced from the intake port 11a into the interior of the motor housing 11 by synchronous rotation of the cooling fan 24 with the rotor shaft 21 of the motor 20 upon which it is fitted circumferentially around, may cool the heat sink 40. Subsequently, the outside air that has mitered into the motor housing 11 may flow from the left side to the right side of the motor 20 along the rotor shaft 21 to cool the motor 20. Then, the outside air (cooling air) may flow along the baffle plate 28 to be discharged to the outside through the exhaust port (not shown). Because of this airflow path, the outside air (cooling air) may not reach the controller 50 in a sufficient manner.

The first linear member 31 (heated portion) of the heat pipe 30 that abuts the lower basal surface of the controller 50 as described, may as a result receive heat from the controller 50, and the heat transport medium (water) in the interior of the heat pipe 30 may evaporate from the linear member 31 end of the heat pipe 30 to move toward the other circular arc member 35 end (heat dissipation portion) of the heat pipe 30 that is connected to the heat sink 40. Conversely, in the circular arc member 35 (heat dissipation portion) of the heat pipe 30 that is connected to the heat sink 40, the heat transport medium (water) may liquefy when the heat sink 40 is cooled by the outside air (cooling air) (because of the heat exchange between the outside air and the heat sink 40). Because of this liquefaction configuration, the liquefied heat transport medium (water) may move from the circular arc member 35 (heat dissipation portion) to the first linear member 31 (heated portion) via gravitational flow. As a result, heat transfer may be performed from the controller 50 to the heat sink 40, thereby cooling the controller 50.

The electric power tool 1 of the exemplary embodiment of the present disclosure may be configured as described above, According to this configuration, the controller 50 may be connected to the heat sink 40 through the heat pipe 30. Because of the heat exchange configuration of both ends of the heat pipe 30 as described above, heat generated by the controller 50 may be transported to the heat sink 30, thereby cooling the controller 50. The heat sink 40 may be provided between the motor 20 and the intake port 11a of the motor housing 11. Because of this configuration, the heat sink 40 may be cooled by the cold outside air that is directly introduced from the intake port 11a of the motor housing 11 and that is not used to cool the motor 20. Because the heat sink 40 is cooled by the outside air in an efficient manner, through its cooling effect and its interaction with the heat pipe 30, the controller 50 that is connected to the heat sink 40 through the heat pipe 30 may also be cooled in an efficient manner. As a result, the controller 50, which the outside air (cooling air) introduced from the intake port 11a by use of the cooling fan 24 does not reach in a sufficient manner, can be cooled in an efficient manner.

Furthermore, according to the configuration, the heat sink 40 may be assembled to the motor housing 11 that houses the motor 20 via the fifth screw B5. Because of this configuration, the heat sink 40 can be easily fixed to the motor housing 11. Furthermore, small vibration of the heat sink 40 can be easily prevented.

Furthermore, according to the configuration, the heat sink 40 may be formed in an annular shape having the interior hole 42. Furthermore, the heat sink 40 may be disposed around the anti-load side of the rotor shaft 21 of the motor 20. Because of this configuration, and its proximity to the intake ports 11a of the motor housing 11, the heat sink 30 may be disposed in the flow path of the outside air (cooling air) introduced from the intake port 11a of the motor housing 11. Because of this configuration, the heat sink 40 can be cooled in an efficient manner.

Furthermore, according to the configuration of the heat sink 40, a plurality of fins 44 may be formed extending radially inward on the inner circumference of the interior hole 42 of the heat sink main body 41. Furthermore, in the heat sink 40, the plurality of fins 44 may be formed over approximately half of the entire circumference, of the heat sink main body 41, and the recess grooves 43a, 46 (a connection area of the heat pipe 30) may be formed over approximately the other half of the entire circumference of the heat sink main body 41. In this way, the plurality of fins 44 and the recess grooves 43a, 46 may comprise the circumferential periphery of the heat sink 40. Thus, the outside air (cooling air) introduced from the intake port 11a of the motor housing 11 can be obtained (received) in a sufficient manner, thereby improving efficiency of the heat exchange between the heat pipe 30 and the heat sink 40.

Furthermore, according to the configuration, the plurality fins 44 may be formed such that each fin surface 44a thereof extends radially inward, toward the longitudinal direction of the rotor shaft 21 of the rotor shaft 21 of the motor 20. Because of this configuration, the flow of the outside air (cooling air) introduced from the intake port 11a of the motor housing 11 is directed radially inward to be spread throughout the motor 20 along the rotor shaft 21, and may be prevented from being blocked.

Furthermore, according to the configuration, the heat sink 40 may include the heat sink main body 41 made of aluminum formed in an annular shape having the interior hole 42 and the cover member 45 also made of aluminum capable of covering the cutout 43 formed in the circumferential peripheral direction of the heat sink main body 41. Furthermore, the circular arc member 35 of the heat pipe 30 may be connected to the heat sink 40 as described. In more detail, the circular arc member 35 of the heat pipe 30 may be held between the heat sink main body 41 and the cover member 45 of the heat sink 40, and both sides of the cover member 45 in the circumferential peripheral direction, that holds the circular arc member 35 of the heat pipe 30, may be fixed to the heat sink main body 41 of the heat sink 40 by use of the two fourth screws 34. Thus, the circular arc member 35 of the heat pipe 30 may be connected to the heat sink 40 such that a wide contact area of the circular arc member 35 of the heat pipe 30 with the heat sink 40 can be obtained. As a result, efficiency of the heat exchange between the heat pipe 30 and the heat sink 40 can be improved.

Furthermore, according to the configuration, when the cutting depth D of the tool main body 10 is set in a normal usage position, in other words, when the user uses the electric power tool 1 in such a manner that the cutting depth of the saw blade 12 is disposed in a range from a position where it becomes the maximum cutting depth Da to a position where it becomes approximately 50% of the maximum cutting depth Da, the first linear member (heated portion) of the heat pipe 30 may be disposed to be in a position ranging from lower than to as high as the circular arc member 35 (heat dissipation portion). When the cutting depth D is large, a large output of the motor 20 may be necessary and also a quantity of heat generated from the controller 50 may become large. According to the electric power tool 1 of the exemplified embodiment, when the cutting depth D of the tool main body 10 is set in a normal usage position, and especially when the electric power tool 1 is used in a state where the cutting depth is large and accordingly the controller 50 is necessary to cool, a state may be maintained where heat transfer from the first linear member 31 (heated portion) to the circular arc member 35 (heat dissipation portion) is performed in a rapid and efficient manner.

It is noted that the present teachings are not limited to the above-described embodiments, and it is understood that variations and modifications may be effected without departing from the spirit and scope of the present teachings. A configuration in which a heated portion of the heat pipe is disposed at a position lower than or as high as a heat dissipation portion of the heat pipe can be applied not only to the portable circular saw exemplified in the electric power tool 1 of the present embodiment but also to any other rotary cutting tool in which a cutting depth is adjustable, especially in which a cutting depth is large.

Furthermore, the electric power tool 1 may be operated not only by AC power but also by DC power such as, for example, a rechargeable battery, Furthermore, material of the heat pipe 30 or the heat sink 40 can be changed to other material having high thermal conductivity Further ore, material for the controller case may be acceptable if its thermal conductivity is 120 to 200 W/mK.

Furthermore, in the present embodiment, the heat dissipation members of FET 61 and the diode bridge 62 contact the thick wall portion 73b. However, the FET 61 and the diode bridge 62 may directly contact the thick wall portion 73b. The same applies to the IPM 63.

Furthermore, the heat sink 40 inlay be assembled to the motor housing 11 in an indirect manner (via a member such as, for example, a bracket). Alternatively, the heat sink 40 may be assembled to the stator 23 of the motor 20. In any case, as a result, the heat sink 40 may be assembled to the motor housing 11.

Furthermore, in the present embodiment, the controller 50 controls driving of the motor 20 of the electric power tool 1. However, the controller 50 may also control an on/off of an illumination device or a buzzer (audible source).

Furthermore, is the present embodiment, the electric power tool 1 may be the portable circular saw. However, the electric power tool 1 may not be limited to the portable circular saw, but may be a grinder or a hummer.

Furthermore, in the present embodiment, the heat sink 40 (heat sink main body 41) may be formed in an annular shape. However, the heat sink 40 may also be formed in approximately in an annular shape but not in a full annular shape, for example, in such a manner that a part of the annular ring is cutout (in a C-shape).

What is claimed is:

1. An electric power tool, comprising;
   a motor including a rotor shaft;
   a cooling fan for cooling the motor;
   an intake port through which outside air is introduced by use of the cooling fan;
   a heating element that generates heat;
   a heat sink that (1) is disposed between the motor and the intake port and (2) includes a heat sink main body that is disposed circumferentially around a longitudinal axis of the rotor shaft and a plurality of fins that extend radially from an inner peripheral surface of the heat sink main body toward the longitudinal axis of the rotor shaft; and
   a heat pipe that connects the heating element and the heat sink, wherein:
   the heat sink includes (1) the plurality of fins around a first half of a circumference of the heat sink and (2) a recessed semicircular groove which is formed over a second half of the circumference of the heat sink, such that the plurality of fins and the recessed groove comprise a circumferential periphery of the heat sink;
   the heat pipe is held securely between the recessed groove of the heat sink and a cover member having an opposite facing semicircular groove to the recessed groove; and
   the cover member is attached to a portion of the heat sink with the recessed groove, using screws.

2. The electric power tool according to claim 1, further comprising a motor housing that houses the heat sink and the motor.

3. The electric power tool according to claim 2, wherein: the heat sink is formed such that the plurality of fins and a connection area of the heat sink to which the heat pipe is connected are disposed circumferentially around the longitudinal axis of the rotor shaft.

4. The electric power tool according to claim 3, wherein the plurality of fins are formed such that each fin surface of the plurality of fins extends in an axial direction parallel with the longitudinal axis of the rotor shaft.

5. The electric power tool according to claim 1, wherein: the electric power tool is a portable circular saw; and a first portion of the heat pipe that connects to the heating element is disposed in a position lower than or as high as a second portion of the heat pipe that connects to the heat sink when the circular saw is used in such a manner that a cutting depth of a saw blade of the circular saw is disposed in a normal usage position.

6. An electric power tool, comprising:
a motor including a rotor shaft;
a cooling fan for cooling the motor;
a plurality of intake ports on one terminal edge of the electric power tool, the plurality of intake ports being configured to introduce outside air by use of the cooling fan;
a heating element disposed on a circuit board that generates heat;
a heat sink that (1) is disposed between the motor and the plurality of intake ports and (2) includes a heat sink main body that is disposed circumferentially around a longitudinal axis of the rotor shaft and a plurality of fins that extend radially from an inner peripheral surface of the heat sink main body toward the longitudinal axis of the rotor shaft; and
a heat pipe that connects the heating element and the heat sink, wherein:
the heat sink includes (1) the plurality of fins around a first half of a circumference of the heat sink and (2) a recessed semicircular groove which is formed over a second half of the circumference of the heat sink, such that the plurality of fins and the recessed groove comprise a circumferential periphery of the heat sink;
the heat pipe is held securelty between the recessed groove of the heat sink and a cover member having an opposite facing semicircular groove to the recessed groove;
the cover member is attached to a portion of the heat sink with the recessed groove, using screws; and
the heat sink and the circuit board are located in separate enclosed housings which communicate with each other through openings in the housings.

7. The electric power tool according to claim 6, further comprising a motor housing that houses the heat sink and the motor.

8. A portable circular saw, comprising;
a motor including a rotor shaft;
a cooling fan for cooling said motor;
a plurality of intake ports on one terminal edge of the circular saw, through which outside air is introduced by use of the cooling fan;
a heating element disposed on a circuit board generates heat;
a heat sink that is disposed between the motor and the plurality of intake ports; and
a heat pipe through which the heating element is connected to the heat sink, wherein:
the heat sink includes a heat sink main body that is disposed circumferentially around a longitudinal axis of the rotor shaft;
a plurality of fins extends radially from an inner peripheral surface of the heat sink main body toward the longitudinal axis of the rotor shaft;
the heat sink includes (1) a plurality of fins around a first half of a circumference of the heat sink and (2) a recessed semicircular groove which is formed over a second half of the circumference of the heat sink, such that the plurality of fins and the recessed groove comprise a circumferential periphery of the heat sink;
the heat pipe is held securely between the recessed groove of the heat sink and a cover member having an opposite facing semicircular groove to the recessed groove;
the cover member is attached to a portion of the heat sink with the recessed groove, using screws;
both the heat sink and the circuit board are located in separate enclosed housings which are able to communicate with each other through an interior opening; and
a first portion of the heat pipe that connects to the heating element is disposed in a position lower than or as high as a second portion of the heat pipe that connects to the heat sink when the circular saw is used in such a manner that a cutting depth of a saw blade of the circular saw is disposed in a normal usage position.

9. The portable circular saw according to claim 8, wherein the healing pipe, which has two terminal ends, comprises a first linear member at one terminal end, a second linear member orthogonal to the first linear member, and a circular arc member also orthogonal to the first linear member comprising the other terminal end.

10. The portable circular saw according to claim 9, wherein the first linear member has an upper surface which abuts and is in contact with a lower basal surface of the circuit board, wherein the circuit board is fully enclosed in a casing except for the region in which it contacts the first linear member of the heat pipe.

11. The portable circular saw according to claim 9, wherein the circular arc member is held securely between the recessed semicircular groove of the heat sink, and the cover member formed as an opposite facing semicircular groove to the recessed groove, wherein the cover member is attached to a portion of the heat sink with the recessed groove, using screws, and holding the pipe in a region that lies therebetween.

12. The portable circular saw according to 10, wherein the casing of the circuit board has a thicker region than a rest of the casing, where the heating element of the circuit board are attached physically to the thicker region.

* * * * *